J. BOLT.
Wagon-Racks.

No. 147,303. Patented Feb. 10, 1874.

WITNESSES:
A. Bennerkendorf.
P. Sedgwick

INVENTOR:
J. Bolt
BY
ATTORNEYS.

UNITED STATES PATENT OFFICE.

JOSEPH BOLT, OF WARSAW, ILLINOIS.

IMPROVEMENT IN WAGON-RACKS.

Specification forming part of Letters Patent No. 147,303, dated February 10, 1874; application filed December 29, 1873.

*To all whom it may concern:*

Figure 1:
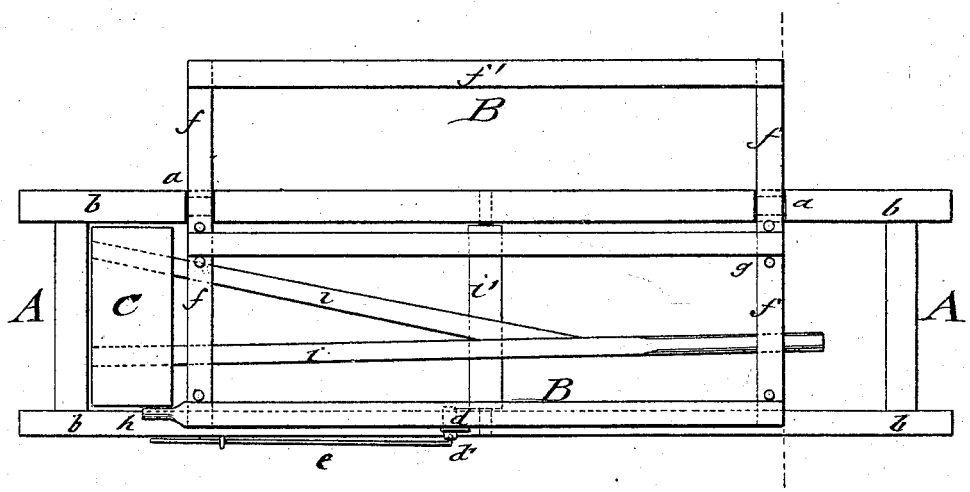
Figure 2:
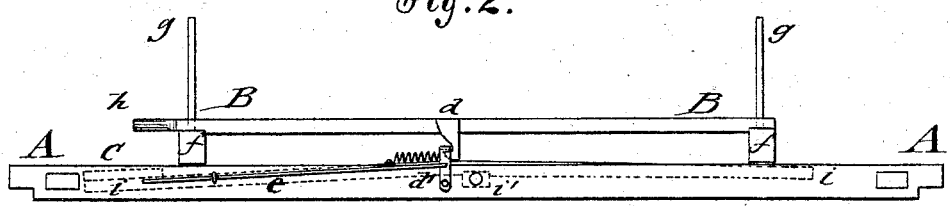
Figure 3:
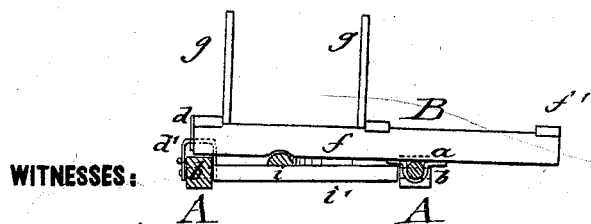

Be it known that I, JOSEPH BOLT, of Warsaw, in the county of Hancock and State of Illinois, have invented a new and Improved Fodder-Rack, of which the following is a specification:

In the accompanying drawing, Figure 1 represents a top view of my improved fodder-rack for unloading corn and other fodder. Fig. 2 is a side view, and Fig. 3 a vertical transverse section, of the same.

Similar letters of reference indicate corresponding parts.

The object of my invention is to furnish to farmers an improved fodder rack or frame, by which corn and other fodder may be easily and rapidly unloaded from the wagon, saving considerable time and labor thereby. My invention consists of a tilting-frame, on which the load is placed and firmly retained by suitable uprights and a binding-pole, and which frame is pivoted to one side beam of a rack, and locked to the other by suitable mechanism.

The tilting of the frame and depositing of the load are performed by taking off the binding-pole, unlatching it and lifting it by means of a handle and foot-lever off the rack, and swinging it to the side of the rack into a vertical position.

In the drawing, A represents the main supporting-rack, of oblong shape and strong timber, which is attached to the body of the wagon in a suitable manner. The tilting-frame B is pivoted by means of iron bands or staples $a$ to the longitudinal side beam $b$ of rack A, and locks by a hook or lug, $d$, over a spring-latch, $d'$, of the opposite longitudinal beam $b$. A lever-rod, $e$, applied to the spring-latch $d'$, serves to detach it from hook $d$, and allows then the lifting of frame B. The lateral pieces $f$ of frame B extend sidewise beyond beam $b$, to which they are pivoted, and are connected longitudinally by piece $f'$, forming thereby an extension of frame B beyond rack A, which allows not only a greater quantity of fodder to be loaded, but facilitates also, by the pressure of the load thereon, greatly the tilting of frame B after it is unlatched. Uprights $g$ and a central binding-pole retain firmly the fodder on the rack during the hauling of the same. Frame B is provided with a handle at that side which is locked to rack A, for lifting the same more easily for unloading. A treadle or foot-board, C, is applied near the front or rear end of rack A to one or more longitudinal levers, $i$, which are fastened to a pivoted lateral piece, $i'$, of rack A, so that the opposite end of lever $i$ bears on frame A, when board C is pressed down by the foot, and assists thereby the tilting of frame B. One person can, in this manner, easily load, haul, and quickly unload the fodder on the rack, expediting the last operation by the tilting of frame B to the side, in the manner described.

Having thus described my invention, I claim as new and desire to secure by Letters Patent—

1. The rack for conveying and unloading fodder, consisting of oblong rack A, tilting-frame B, pivoted to one side thereof and locked to the other, and pivoted lever $i$ $i'$, with foot-board C, all combined to operate substantially as and for the purposes described.

2. The tilting-frame B, extended sidewise beyond the beam of rack A, to which it is pivoted, so that the weight of the load may assist in the tilting of the frame as it is lifted by handle $h$ and lever $i$, all as set forth.

JOSEPH BOLT.

Witnesses:
BENNETT BOLT,
JUSTUS MILDNER.